(No Model.)
J. W. CHENEY.
SCREW CLAMP.
No. 368,278. Patented Aug. 16, 1887.
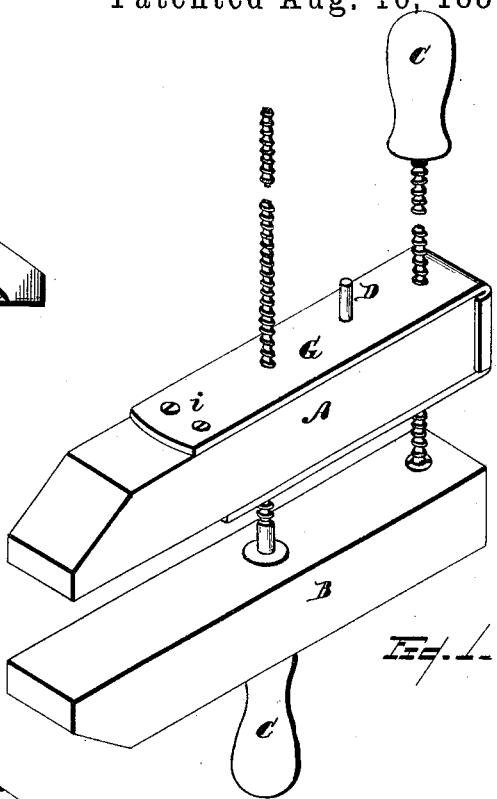
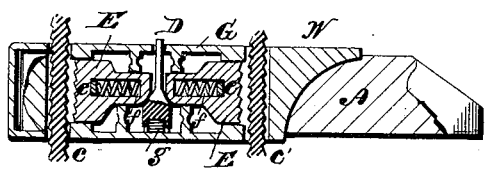
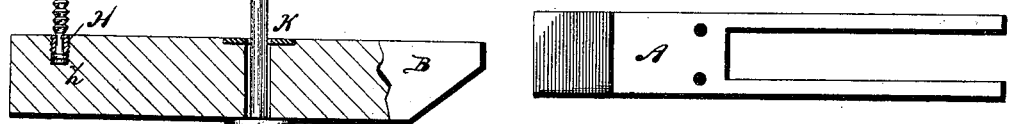
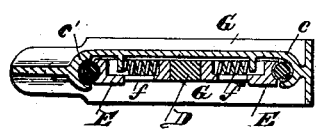
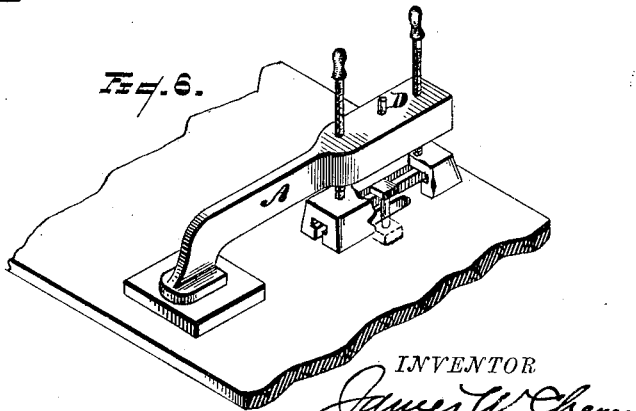
WITNESSES
Samuel E. Thomas
N. S. Wright
INVENTOR
James W. Cheney
By W. W. Leggett
Attorney

UNITED STATES PATENT OFFICE.

JAMES W. CHENEY, OF DETROIT, MICHIGAN.

SCREW-CLAMP.

SPECIFICATION forming part of Letters Patent No. 368,278, dated August 16, 1887.

Application filed September 25, 1886. Serial No. 214,576. (No model.)

*To all whom it may concern:*

Be it known that I, JAMES W. CHENEY, a citizen of the United States, residing at Detroit in the county of Wayne and State of Michigan, have invented a new and useful Screw Clamp, of which the following is a specification.

My invention relates to improvements in screw-clamps in which the jaws are operated by two screws parallel to each other, and by turning these screws the jaws are adjusted to or from each other.

The object of my invention is to provide means by which the jaws of the clamps can be instantaneously adjusted to or from each other without turning the screws. I attain this object by mechanism illustrated in the accompanying drawings, in which—

Figure 1 is a perspective view of the clamp. Fig. 2 is a vertical section of one of the jaws, showing the half-nuts withdrawn from the operating-screws. Fig. 3 is a vertical section of the device, showing the half-nuts engaged with the operating-screws. Fig. 4 is a horizontal section of part of the mechanism. Fig. 5 is a plan view of the jaw which carries the half-nuts, said half-nuts, the operating devices, and the shell being removed. Fig. 6 shows the device applied as a bench-clamp.

Similar letters of reference refer to similar parts throughout the several views.

In Fig. 1, A is the screw-jaw, and B is the shoulder-jaw. D is the end of the wedge coming through the metal shell G, which contains the mechanism for locking and unlocking the screws $c$ and $c'$. C C are the handles on the end of and operate the screws. $k$ is a washer fastened to the screw $c'$ as it passes through the jaw B. $i$ are small wood-screws to fasten the shell G to the screw-jaw A.

The operation of the mechanism is shown in sectional view Fig. 2, and is as follows: E E are two half-nuts engaging the screws $c\ c'$ at all times when not released by pressing down the wedge D, which extends through the shell. When the wedge D is pressed down, the springs $ff$ in the half-nuts E E operate to throw the half-nuts toward the narrow part of the wedge, as shown in Fig. 2, and are thus entirely disengaged from the screws $c$ and $c'$. The effect of this is to allow the jaw A to move to and from the jaw B without turning the screws, as the jaw A then slides freely on the screws $c$ and $c'$ at the ends of the passage-ways for the screws $c\ c'$ on the jaw. The screws have a solid bearing all around, but large enough to permit the screws passing through freely, and at the same time making a guide for them. Opposite the half-nuts and between the ends of the passage-ways for the screws the screws have a bearing half-way round in addition to the solid all-round at the ends of the passage-way. When the wedge D is released by withdrawing the pressure, the spring $g$, being strong enough to overcome the pressure of the two small springs $ff$, operates to force the half-nuts E E into position to engage the screws $c\ c'$. When in this position, the half-nuts, engaging the screws, and the wedge D form a solid lock between the screws, so that the jaw A cannot be moved except by turning the screws. The small springs $ff$ in the half-nuts bear against the uprights $e\ e$ at one end, and the other end of the spring bears against the inside of the half-nut, so the pressure of the springs shall be toward the wedge D. These uprights also serve as a guide, so the half-nuts E E shall move in a line at right angles with the screws. The metal shell is strengthened at the ends by the webs W, connecting the top and bottom flanges of the shell G. The screw $c'$ is fastened to the shoulder-jaw B by the washer $k$, which is fastened to the screw by a burr, $k'$, on the screw, or by any other suitable way. The screw $c$ is fastened to the shoulder-jaw B by having a ferrule or ring, H, loosely riveted on the end. This ring has a thread cut on its outer surface, by which it is turned into and fastened to the jaw B, at the same time allowing it to turn freely. At the end of this screw $c$ there is a metal bearing, $h$, to take the wear and pressure of the screw.

The jaws of my improvement are made of a combination of metal and wood, as shown.

Fig. 5 shows a top view of the jaw A with the metal frame partly drawn out, the wood being mortised out at $j$ to receive the metal frame containing the half-nuts and wedge. When these are in their places, the metal frame is then pushed in and fastened with screws $i$, as shown in Fig. 1.

Fig. 6 shows the application of my improvement as a bench-clamp, in which the jaw A is extended and faced with wood.

The advantages I claim over the screw-clamp now in general use is a great saving of time, as the jaws on my improvement can be instantly adjusted to or from each other to their fullest extent without turning either screw, and then the pressure can be applied as desired by turning either or both screws, while in the ordinary screw-clamp much time is lost in turning both screws to bring the jaws to the required positions. I also claim that by using the metal frame with the wood I gain strength, whereas the wood that is cut away in the ordinary screw-clamp for the screws to pass through is not strengthened as mine is, but made less strong.

Having fully described my invention, what I claim is—

1. In a screw-clamp, the combination, with the jaws A and B and their adjusting-screws, of movable half-nuts to engage said screws, springs $f$, located in said nuts to throw them out of engagement with the screws, a sliding wedge located between said half-nuts to operate the same, and a spring, $g$, located beneath the wedge to force it into contact with the half-nuts and cause them to engage the screws.

2. In a screw-clamp, the combination, with the jaws A and B, provided with adjusting-screws, of a metallic shell, G, engaged with one of said jaws, movable half-nuts to engage said screws and located within said shell, springs $f$, placed to said nuts to disengage them from the screws, a wedge located between said half-nuts to operate the same, and a spring, $g$, bearing against the inner end of the wedge to throw the wedge and half-nuts into engagement and cause the said nuts to engage the screws, substantially as described.

3. In a screw-clamp, the combination, with the jaws A and B and their adjusting-screws, of movable half-nuts to engage said screws, retracting-springs $f$, located in said nuts, a sliding wedge located between said half-nuts, and a spring, $g$, engaging the inner end of said wedge, arranged to drive it outward against the inner ends of the half-nuts, whereby an inward pressure on the wedge will disengage the screws and half-nuts and the removal of pressure will cause said nuts to automatically engage the screws, substantially as described.

JAMES W. CHENEY.

Witnesses:
C. A. PRESTON,
E. H. CHENEY.